United States Patent [19]

Manigault

[11] 3,945,839

[45] Mar. 23, 1976

[54] ALUMINA REFRACTORY

[75] Inventor: Edward L. Manigault, Cincinnati, Ohio

[73] Assignee: N L Industries, Inc., New York, N.Y.

[22] Filed: Oct. 3, 1974

[21] Appl. No.: 511,795

Related U.S. Application Data

[63] Continuation-in-part of Ser. No. 402,403, Oct. 1, 1973, abandoned.

[52] U.S. Cl. .................................................. 106/66
[51] Int. Cl.² ..................... C04B 35/10; C04B 35/42
[58] Field of Search ............................... 106/66, 65

[56] References Cited
UNITED STATES PATENTS 2,852,401  9/1958  Hansen et al. ........................ 106/66
3,669,889  6/1972  Juzvuk et al. ........................ 106/66

*Primary Examiner*—J. Poer

[57] ABSTRACT

A new refractory material has been prepared comprising 70 to 96% alumina, 3 to 20% iron chromite ore, and 1 to 10% of a phosphate compound, calculated as $P_2O_5$.

The new refractory material is prepared by admixing 70% to 96% alumina, 3% to 20% iron chromite ore, and 1% to 10% of a phosphate compound selected from the group consisting of aluminium phosphate and phosphoric acid, said phosphate compound calculated at $P_2O_5$, and firing the mixture to form the refractory product. This new refractory material has a low porosity, high bulk density and modulus of rupture.

7 Claims, No Drawings

ALUMINA REFRACTORY

This application is a continuation-in-part of our application Ser. No. 402,403, filed Oct. 1, 1973, now abandoned.

BACKGROUND OF THE INVENTION

High alumina containing refractories have been produced for structural material, such as bricks and the like, for many years. Attempts have been made in the past to improve the products by adding various components to the alumina composition. In order to produce refractory products of more strength and longer service life, chromic-oxide has been added in varying amounts. This alumina-chromic oxide refractory is more dense and less porous than the alumina refractories containing no chromic oxide.

Another refractory composition containing alumina and iron-chromite ore has been prepared which possesses still greater strength and is more dense than the known alumina-chromic oxide refractory product. This particular refractory containing alumina and iron-chromite ore is described and claimed in my copending application Ser. No. 309165 filed Nov. 24, 1972. This application is assigned to the same assignee as the instant application.

SUMMARY OF THE INVENTION

A refractory composition having still greater strength has been prepared comprising:

| | |
|---|---|
| Alumina | 70% to 96% |
| Iron Chromite Ore | 3% to 20% |
| Phosphate Compound, calculated as $P_2O_5$. | 1% to 10% |

This refractory composition is prepared by admixing the alumina, the iron chromite ore and the phosphate compound and firing the mixture to produce the refractory composition.

This instant refractory composition possesses a much higher strength than the former alumina or alumina-chromic oxide refractories. In addition, the instant refractory composition has a greater bulk density than that of the prior art products.

DESCRIPTION OF THE PREFERRED EMBODIMENTS

It has been discovered that an improved composition may be produced which comprises alumina, an iron-chromite ore and a phosphate compound.

Iron chromite ore usually contains from 35% to 50% $Cr_2O_3$, from 15% to 35% FeO and from 25% to 40% oxides of silicon, magnesium, calcium, aluminium and other metal oxides.

With respect to the phosphate compound employed, those which are particularly effective are phosphoric acid and aluminium phosphate. The phosphate compound or mixture of phosphate compounds is added in amounts from 1% to 10% $P_2O_5$ by weight. During the firing of this composition a portion of the phosphate content may be lost by vaporization.

This composition is either fired to produce fired refractory products, or the mixture without firing is used either as a ramming mixture, or as a plastic mixture.

When it is desired to produce a plastic mixture, small amounts of bentonite (1 – 4%) and water (1 – 12%), if needed, are added to the mixture. The presence of the bentonite increases the plasticity in the mixture. The plastic mixture contains the following ingredients:

| | |
|---|---|
| Alumina | 72 – 94% |
| Iron Chromite Ore | 3 – 20% |
| Phosphate Compound (Calc. as $P_2O_5$) | 1 – 10% |
| Bentonite | 1 – 4% |
| Water | 0 – 12% |

The presence of the bentonite in the mixture is not necessary when the mixture is used as a ramming mix, or when fired to produce the refractory composition described above.

In preparing the refractory composition of the instant invention the iron-chromite ore should be ground to −325 mesh.

65% to 94% of the alumina should be −¼ inch to +325 mesh in size while the remainder should be ground to −325 mesh.

Tabular alumina may be used exclusively, but it is preferred to have a mixture of tabular and calcined alumina.

The tabular alumina when used should be employed in various sizes. All of the −¼ inch +325 mesh alumina should be employed in the tabular form and in addition, with respect to the −325 mesh alumina, from ¼ to all of the −325 mesh alumina should be present in the tabular form. If calcined alumina is used, it should be −325 mesh in size.

In preparing the composition, the alumina, the iron-chromite ore and the phosphate compound are mixed together sufficiently to temper the mix properly. Formed shapes are fired at a temperature from 350°C to 1650°C for 2 to 8 hours to form the refractory composition.

In order to describe the instant invention more fully, the following examples are presented:

EXAMPLE 1

In this Example, the iron-chromite ore used was ground to −325 mesh and had the following chemical analysis:

| | |
|---|---|
| $Cr_2O_3$ | 45.66% |
| Fe | 19.98% |
| $Al_2O_3$ | 15.26% |
| $SiO_2$ | 1.47% |
| $O_2$ | 7.26% |
| MgO | 10.24% |
| CaO | 0.13% |

Both tabular and calcined alumina were employed.

The −¼ inch +325 mesh tabular alumina had the following size distribution:

−¼ inch + 60 mesh 66%

−60 mesh + 325 mesh 34.0%

In preparing the refractory composition of the instant invention the following ingredients were thoroughly blended to form a homogeneous mixture:

74 kg of +325 mesh tabular alumina 6 kg of −325 mesh tabular alumina 15 kg of −325 mesh calcined alumina 5 kg of −325 mesh iron-chromite ore 5.2 kg of 80% phosphoric acid Bricks 9 inches × 4½ inches × 3 inches were formed and fired at 1560°C for 5 hours.

The fired bricks were examined and found to possess the following properties:

| | |
|---|---|
| Modulus of Rupture, psi | 7024 |
| Porosity, % | 13.9 |
| Bulk Density, g/cc | 3.25 |

These properties are greatly improved over the alumina-chromic oxide refractory products described in the prior art.

EXAMPLES 2–5

The procedure of Example 1 was repeated using various amounts of calcined alumina, iron-chromite ore, and a phosphate compound.

Two control runs were also carried out in which no phosphates were used (Control A) and in which chromic oxide was used in place of iron chromite ore and no phosphates were employed. (Control B)

In all of these examples, improved results were obtained over the products of the prior art control runs. The results of these examples along with those of Example 1 and the control runs are presented in the following table:

tonite and 0–12% water, if necessary. The plastic mix was prepared as follows:

EXAMPLE 7

The following ingredients were mixed to form a plastic mixture-

| | | |
|---|---|---|
| Tabular Alumina | −4+60 mesh, Kg. | 46 |
| Tabular Alumina | −60+325 mesh, Kg. | 18 |
| Tabular Alumina | −325 mesh, Kg. | 19 |
| Calcined Alumina | −325 mesh, Kg. | 5 |
| Phosphoric Acid (80%) | Kg. | 12 |
| Bentonite | −325 mesh, Kg. | 1 |
| Iron Chromite Ore | −325 mesh, Kg. | 10 |

Tests have shown that this plastic mix gives superior service life compared to mixes not containing either the iron chromite ore or the phosphate compounds.

From the data obtained, it has been shown that the properties of the alumina refractories which employed iron-chromite ore and phosphates are superior to the controls which used chromic oxide in place of the iron-chromite ore and which employs no phosphates.

| Material, kg. | Example Number | | | | | Control A | Control B |
|---|---|---|---|---|---|---|---|
| | 1 | 2 | 3 | 4 | 5 | | |
| Tabular Alumina, +325 mesh Kg | 74 | 74 | 74 | 66.5 | 64.1 | 64.1 | 90 |
| Tabular Alumina, −325 mesh Kg | 6 | 6 | 6 | 19.4 | 12.4 | 12.4 | 0.0 |
| Calcined Alumina, −325 mesh Kg | 15 | 10 | 5 | 4.7 | 6.1 | 6.1 | 0.0 |
| Iron Chromite, −325 mesh Kg | 5 | 10 | 15 | 10.0 | 17.4 | 17.4 | 0.0 |
| Phosphoric Acid (80%) Kg | 5.2 | 0.0 | 0.0 | 5.3 | 6.0 | 0.0 | 0.0 |
| Aluminum Phosphate Kg | 0.0 | 4.8 | 5.0 | 0.0 | 0.0 | 0.0 | 0.0 |
| Lignin Liquor Kg | 0 | 0 | 0 | 0.0 | 0.0 | 2.3 | 3.8 |
| Chromic Oxide Kg | 0.0 | 0.0 | 0.0 | | | 0.0 | 10 |

| Properties: | Example Number | | | | | Control A | Control B |
|---|---|---|---|---|---|---|---|
| | 1 | 2 | 3 | 4 | 5 | | |
| Modulus of Rupture psi | 7024 | 8840 | 6543 | 7540 | 7728 | 5775 | 4500 |
| Apparent Porosity, % | 13.9 | 13.3 | 14.1 | 13.9 | 15.6 | 17.1 | 16.5 |
| Bulk Density, gm/cc | 3.25 | 3.25 | 2.03 | 3.25 | 3.24 | 3.17 | 3.16 |

It has also been discovered that the mixture of alumina, iron chromite ore, and a phosphate compound may be used as a ramming mixture and that this mixture is superior over an alumina, phosphate mixture which contains no iron chromite ore. In order to show this superiority the following ramming mixtures were prepared:

EXAMPLE 6

9 Kg alumina, 1 Kg iron-chromite ore were mixed with 0.34 Kg of phosphoric acid (calculated as $P_2O_5$.)

The sizes of the ingredients used were substantially the same as those previously described.

For a direct comparison, 9 Kg of alumina and 0.34 Kg of phosphoric acid were admixed without employing any iron chromite ore.

When these ramming mixes were tested in contact with iron oxide at 1560°C, the mix containing the iron-chromite ore resulted in little or no reaction and the bricks remained unaltered while the ramming mix which contained no iron-chromite ore produced a severe reaction and caused considerable expansion resulting in failure of the ramming mix which contained no iron-chromite ore. In addition, the iron oxide penetration of the control was twice that of the ramming mix which contained the iron chromite ore in addition to the alumina and phosphate compound.

In order to produce a plastic mix, the same mixture is used except that it is desirable also to add 1–4% ben- The instant invention is also useful for preparing plastic or ramming mixes which are superior to the prior art products.

While this invention has been described and illustrated by the examples shown, it is not intended to be strictly limited thereto, and other variations and modifications may be employed within the scope of the following claims.

I claim:

1. A refractory composition comprising from 70% to 96% alumina, from 3% to 20% iron chromite ore, and from 1% to 10% of a compound selected from the group consisting of phosphoric acid and aluminum phosphate, said compound calculated as $P_2O_5$, all of the percentages expressed on a weight basis.

2. Composition according to claim 1 in which from 65% to 94% of the alumina present in said composition is of a size from −¼ inch to −325 mesh, the remaining alumina refractory raw material being −325 mesh.

3. A process for preparing a refractory composition which comprises admixing 70% to 96% alumina, 3% to 20% iron-chromite ore, and 1% to 10% of a compound selected from the group consisting of phosphoric acid and aluminum phosphate, said compound calculated as $P_2O_5$, all of the percentages expressed on a weight basis, forming said mixture into a ceramic body and firing said body at temperature from 350°C. to 1650°C. from 2 to 8 hours to form said refractory composition.

4. A process for preparing a refractory composition which comprises admixing 70% to 96% alumina, 3% to 20% iron-chromite ore, and 1% to 10% of a compound selected from the group consisting of phosphoric acid and aluminum phosphate, said compound calculated as $P_2O_5$, all of the percentages expressed on a weight basis, from 65% to 94% of said alumina having a size from −¼ inch to +325 mesh, the remaining alumina being −325 mesh, forming said mixture into a ceramic body and firing said body at temperature from 350°C. to 1650°C. for 2 to 8 hours to form said refractory composition.

5. Process according to claim 4 in which the +325 mesh alumina is tabular alumina, the remaining −325 mesh alumina containing from 0% to 75% calcined alumina, the remainder of the −325 mesh alumina being present in the tabular form.

6. A ceramic composition useful as a plastic mix comprising 70% to 96% alumina, 3% to 20% iron-chromite ore, 1% to 4% bentonite, 0% to 12% water and 1% to 10% of a compound selected from the group consisting of phosphoric acid and aluminum phosphate, said compound calculated as $P_2O_5$, all of the percentages expressed on a weight basis.

7. A ramming mix comprising 70% to 96% alumina, 3% to 20% iron-chromite ore, and 1% to 10% of a compound selected from the group consisting of phosphoric acid and aluminum phosphate, said compound calculated as $P_2O_5$, all of the percentages expressed on a weight basis.

* * * * *